3,163,666
MANUFACTURE OF 4,4'-METHYLENE-BIS-(PHENYL ISOCYANATE)
Voldemar Kirss, Buffalo, and Richard G. Spaunburgh, Elma, N.Y., assignors to Allied Chemical Corporation, New York, N.Y., a corporation of New York
No Drawing. Filed July 15, 1960, Ser. No. 42,966
1 Claim. (Cl. 260—453)

The invention relates to the preparation of 4,4'-methylene-bis-(phenyl isocyanate) and more particularly it relates to an improved preparation of 4,4'-methylene-bis-(phenyl isocyanate) from crude 4,4'-methylenedianiline.

It is well known to prepare 4,4'-methylene-bis-(phenyl isocyanate) by reacting the corresponding diamine with phosgene in the presence of a relatively low boiling inert organic solvent. The crude product thus obtained, after removal of the solvent, was distilled to recover the pure diisocyanate. Unfortunately, in this distillation step, the reactive diisocyanate undergoes polymerization with itself and reacts with other materials present, thus consuming significant portions of the desired product. Further after removal of a substantial portion of the product by distillation, the residue undergoes decomposition with the evolution of copious quantities of gas which results in a loss of vacuum. The final portion of the product is thus lost. The residue is quite viscous and must be removed from the distillation kettle at relatively high temperatures, about 200° C., since below that temperature the residue sets to a hard brittle mass which creates an operational hazard to the equipment.

It was thought previously that these problems could be overcome by utilizing pure diamine as starting material. However, this method merely emphasizes the observation that the difficulties encountered in the recovery of pure diisocyanate from the crude reaction mass result from the tendency of that product to polymerize with itself to a greater degree than to react with impurities.

Accordingly, it is a prime object of this invention to devise an improved process for the preparation of 4,4'-methylene-bis-(phenyl isocyanate). Another object is to provide a process for producing 4,4'-methylene-bis-(phenyl isocyanate) which does not involve operational hazards to the equipment. Still another object is to devise a practical commercial method for preparing 4,4'-methylene-bis-(phenyl isocyanate).

Other objects and advantages ancillary thereto will be obvious from the following description of our invention.

In accordance with the present invention, crude 4,4'-methylenedianiline is produced by condensation of aniline and formaldehyde in the presence of a mineral acid, the resultant reaction products neutralized with an aqueous alkaline solution to form a lower aqueous layer and an upper organic layer, separating the lower aqueous layer from the upper organic layer containing 4,4'-methylenedianiline, heavier residual constituents having a boiling point higher than 4,4'-methylenedianiline and more volatile constituents than 4,4'-methylenedianiline specifically unreacted aniline and moisture, stripping the upper organic layer to remove only the more volatile constituents leaving as residue a crude product containing the heavier residual constituents having a setting point [1] within the range of 70° C. to 85° C. and containing less than about 1% of aniline, admixing an inert solvent with said crude product having a setting point in the range of 70° to 85° C., introducing phosgene into the solution of crude product to react 4,4'-methylenedianiline in the crude product with the phosgene to produce 4,4'-methylene-bis-(phenyl isocyanate), separating the inert solvent from the reaction product and distilling and recovering 4,4'-methylene-bis-(phenyl isocyanate) leaving as distillation residue an easily pourable mass which is fluid as low as 100° C.

The preparation of crude 4,4'-methylene-aniline is accomplished by heating formaldehyde, or a substance which will yield formaldehyde in situ, with aniline, generally a molar excess of aniline in the proportion of 2–4 preferably about 3 mols aniline per mol of formaldehyde, in the presence of a catalyst, e.g., aqueous hydrochloric acid at a temperature of 70° to 100° C. for a period of about 2 to 5 hours. The resultant reaction product is a mixture principally of 4,4'-methylenedianiline together with more volatile unreacted aniline and higher boiling constituents (less volatile than 4,4'-methylenedianiline). Acid catalyst may be removed by neutralization with alkali, for example, by adding aqueous sodium hydroxide solution which reacts with the acid to form a salt and the aqueous salt solution separates out as a lower layer which is withdrawn. The upper layer which contains the methylene-dianiline together with more volatile aniline and moisture and less volatile constituents is stripped of the more volatile constituents preferably by heating in vacuo. The moisture and excess aniline are removed as vapors until the upper layer contains less than about 1% aniline and has a setting point of less than 85° C. but more than 70° C. The stripped product contains about 75 to over 90% of pure 4,4'-methylenedianiline (setting point of pure methylene-dianiline about 90° C.) with the balance higher boiling residue.

Phosgenation of the 4,4'-methylenedianiline in the stripped upper layer, crude 4,4'-methylenedianiline, to produce 4,4'-methylene-bis-(phenyl isocyanate) is accomplished by admixing the crude 4,4'-methylenedianiline with a solvent which will not react under the conditions of operation and which is normally liquid and has a boiling point below the boiling point of 4,4'-methylene-bis-(phenyl isocyanate). The preferred inert solvent is monochlorobenzene, but alternate solvents as o-dichlorobenzene, ethylbenzene, naphthalene, xylene, kerosene and the like can be used. The amount of solvent employed is not critical, generally a solvent 2 to 10 times the amount of crude methylenedianiline will be satisfactory. Phosgenation may be accomplished in one step or in a plurality of steps, but in all instances to complete the formation of the diisocyanate the reaction mixture must be heated at elevated temperatures above 95° C. usually within the range of 100–200° C., generally between 100–150° C. In a two step procedure the diamine is subjected first to a partial phosgenation at low temperatures, e.g., 0–50° C. and then to phosgenation at elevated temperatures above 100° C. It is immaterial to the operation whether phosgenation is carried out in one or a plurality of stages. After completion of the phosgenation, the reaction mixture is subjected to distillation under vacuum to first remove the inert solvent and then to remove the desired 4,4'-methylene-bis-(phenyl isocyanate) which although distilled under high vacuum of less than 10 mm. mercury absolute pressure requires a pot temperature of about 200° C. or higher. The residue remaining in the pot after distillation of the 4,4'-methylene-bis-(phenyl isocyanate) is a fluid which will not solidify at a temperature as low as 100° C. and can be easily and conveniently withdrawn as a liquid from the pot.

The utilization of a crude grade of methylenedianiline obviously results in a more economic process, since the relatively costly step of purification by a vacuum distillation has been obviated. In addition, our new process results in the following surprising advantages:

A. The yield obtained is equal to or better than the yield

---
[1] See Methoden der Organischen Chemie (Heuben-Weyl), Band II: Analytische Methoden, p. 803 (Georg Thieme Verlag, 1953).

obtained when using an equal amount of the purified diamine.

B. The phosgenation process can be carried out in a shorter time.

C. The residue remaining after distillation of the 4,4'-methylene-bis-(phenyl isocyanate) is fluid at temperatures as low as 100° C. and hence the equipment hazard is reduced. Concomitantly, the hazard to personnel of handling the viscous tarry residue at temperatures in the neighborhood of 200° C. is eliminated.

The net result of these several advantages is to improve the process of preparing 4,4'-methylene-bis-(phenyl isocyanate) to make it more efficient, more economical and involve less operation hazards to the equipment and personnel.

The following examples will illustrate the process of the present invention. Parts are by weight and temperatures are given in degrees centigrade.

*Example I*

4 mols formaldehyde (aqueous formaldehyde 37% concentration), 12 mols aniline, 8 mols HCl (20° Bé. hydrochloric acid) and 50 mols water were mixed with agitation at a temperature of about 30° and then heated at a temperature of about 90° for about 4 hours to effect condensation of the formaldehyde and aniline to produce 4,4'-methylenedianiline. Aqueous caustic soda solution (10 mols NaOH) was mixed with the reaction mass and the mixture was heated to a temperature of 95°. The resultant reaction mass after settling for one hour separated into a lower aqueous layer and an upper organic layer. The upper organic layer after separation from the lower layer was heated to drive off as vapors all moisture and substantially all unreacted aniline. The unvaporized portion of the upper layer, crude methylenedianiline, had the following analysis:

Aniline _____ percent__ 0.8  
4,4'-methylenedianiline, S.P. 89.6° ____do____ 78.5 (¹)  
Residue _____ do____ 20.7  
Setting point of crude _____degrees__ 77.6

¹ By distillation.

A solution of 132 parts of the above crude methylenedianiline in 660 parts of monochlorobenzene was added slowly (½ hour) to a cold (0° to −10°) solution of 122 parts of phosgene in 385 parts of monochlorobenzene. The temperature rose to 15° during the addition. Thereafter, the resulting slurry was warmed to 30° in ½ hour and a stream of phosgene at the rate of 38 parts/hour was introduced into the slurry while heating the latter to and maintaining it at its reflux temperature 132°. The reaction was continued for 5 hours at which time the reaction mixture became clear. The resulting clear solution was refluxed for 15 to 30 minutes, purged with nitrogen for 2 hours at 110° to 120° and then clarified by filtration at 80°. The clarified solution was stripped of monochlorobenzene in vacuo and the residue distilled through a 6 inch Vigreux fractionating column to collect a product fraction boiling between 185° and 188°/4 mm. absolute mercury pressure. The pot temperature ranged between 199° and 228° during the collection of the product fraction. The yield of product was 115 parts which was a yield of 88% of the theoretical amount $$(132 \times .785 = 103.8)$$

obtainable from the diamine available by distillation from the crude diamine. The residue remaining amounted to 38 parts and was readily poured from the pot at about 100°.

*Example II*

For comparison purposes, the following experiment was run using distilled methylenedianiline (S.P. 89.6°) obtained from a batch of crude diamine prepared by the same procedure as that used in Example I.

To a cold (0° to −10°) solution of 100 parts of phosgene in 385 parts of monochlorobenzene, a hot (80° to 90°) solution of 132 parts of distilled 4,4'-methylenedianiline in 660 parts of monochlorobenzene was added in ½ hour maintaining the temperature of the mass at below 15°. The resulting slurry was warmed to 30° during ½ hour and then a stream of phosgene was introduced at the rate of 66 parts/hour and continued while the mixture was heated to and maintained at the reflux temperature (132°) for 5 hours. The addition of phosgene was stopped and the mass refluxed for 15 to 30 minutes. It was then purged at 100° to 120° with nitrogen for 2 hours and clarified by filtration at 80°.

The clarified filtrate was stripped of monochlorobenzene and the crude product distilled through a 6-inch Vigreux column, collecting a product fraction boiling between 191.5°/4.2 mm. and 199°/6.5 mm. mercury absolute pressure. The pot temperature during the product run was 204° to 225°. The product fraction weighed 130 parts and represented a yield of 78% based on 132 parts of pure methylenedianiline.

Towards the end of the distillation, difficulty was experienced maintaining the vacuum due to the evolution of gas and thus the product was collected at a higher temperature. The residue weighed 9.5 parts and was pourable only above 200°. Below that temperature the tarry mass froze to a hard brittle solid which was removable only with extreme difficulty.

*Example III*

7 mols formaldehyde (aqueous formaldehyde 37% concentration), 20.8 mols aniline, 13.9 mols HCl (20° Bé. hydrochloric acid) and 87 mols water were mixed with agitation at a temperature of 25–30° and then heated at a temperature of about 90° for 3–4 hours to effect condensation of the formaldehyde and aniline to produce 4,4'-methylenedianiline. Aqueous caustic soda solution (17.5 mols NaOH) was mixed with the reaction mass and the mixture was heated to a temperature of 90–95°. The resultant reaction mass after settling for one hour separated into a lower aqueous layer and an upper organic layer. The upper organic layer after separation from the lower layer was heated to drive off as vapors all moisture and substantially all unreacted aniline. The unvaporized portion of the upper layer, crude methylenedianiline, had the following analysis:

Aniline _____percent__ 0.8  
Methylenedianiline _____do____ 83.0 (¹)  
Residue _____do____ 16.2  
Setting point of crude degrees _____ 79.4

¹ By distillation.

A solution of 122 parts of the above crude methylenedianiline in 660 parts of monochlorobenzene was added to a cold (0° to −10°) solution of 100 parts of phosgene in 385 parts of monochlorobenzene, while maintaining the mixture at 15° or below. The slurry was warmed to 30° during ½ hour; and then, as the mixture was heated to and maintained at its reflux temperature for 5 hours, a stream of phosgene was passed into the mass at the rate of 75 parts/hour. The phosgene was stopped and after continuing the refluxing for 15 to 30 minutes, the mass was purged with nitrogen at 110° to 120° for 2 hours. Thereafter, the mass was clarified by filtration. The clarified solution was stripped of chlorobenzene and the residue was distilled in vacuo to collect a product fraction weighing 109 parts at 182°/3.7 mm. to 187°/2.8 mm. The pot temperature varied from 200° to 246°. The residue weighed 29 parts and was readily removed from the pot. The product yield was 85.1% based on 101.3 parts of pure diamine (122 × .83).

*Example IV*

For comparison purposes the procedure of Example III was repeated using 132 parts of distilled 4,4'-methylenedianiline (S.P. 90°) obtained from a batch of crude diamine prepared by the same procedure as that used in Example III. In this experiment, the hot phosgenation step required 6¼ hours using a phosgene feed rate of 77 parts/hour. The diisocyanate product was collected at 175°/2.5 mm. to 184°/2.6 mm. and weighed 138 parts (83% yield). The pot temperature varied from 196° to 210°. The residue of 15 parts was pourable at above 200°, setting to a non-mobile mass below that temperature.

Although certain preferred embodiments of the invention have been illustrated in the above examples, it will be obvious to those skilled in this art that various modifications can be made therein without departing from the scope and spirit of our invention.

We claim:

A process for the manufacture of 4,4'-methylene-bis-(phenyl isocyanate) which comprises admixing formaldehyde and aniline in the proportion of 2-4 moles aniline per mole of formaldehyde, condensing the formaldehyde and aniline by heating at a temperature of 70° to 100° C. in the presence of hydrochloric acid to produce crude 4,4'-methylenedianiline, adding an aqueous alkaline solution to the crude 4,4'-methylenedianiline to neutralize the hydrochloric acid therein to form a lower aqueous layer containing the salt resulting from the neutralization and an upper organic layer containing 4,4'-methylenedianiline, heavier residual constituents having a boiling point higher than 4,4'-methylenedianiline and unreacted aniline and moisture more volatile than 4,4'-methylenedianiline, separating the lower aqueous layer from the upper organic layer, stripping the upper organic layer to remove only the more volatile constituents leaving as residue a stripped crude product containing at least 75% 4,4'-methylenedianiline and heavier residual constituents, said stripped crude product having a setting point with the range of 70° C. to 85° C. and containing less than about 1% aniline, admixing an inert solvent with said stripped crude product having a setting point within the range 70° C. to 85° C., introducing phosgene into the mixture of inert solvent and stripped crude product and heating to a temperature within the range of about 100° C. to 200° C. to effect reaction of 4,4'-methylenedianiline in the stripped crude product with the phosgene to produce 4,4'-methylene-bis-(phenyl isocyanate), separating the inert solvent from the resultant reaction products and distilling the reaction products after separation of the inert solvent to remove as overhead 4,4'-methylene-bis-(phenyl isocyanate) leaving as distillation residue an easily pourable mass which is fluid as low as 100° C.

References Cited in the file of this patent

UNITED STATES PATENTS

| | | |
|---|---|---|
| 2,683,730 | Seeger et al. | July 13, 1954 |
| 2,938,054 | Demers et al. | May 24, 1960 |
| 2,950,263 | Abbotson et al. | Aug. 23, 1960 |